(12) United States Patent
Hann

(10) Patent No.: US 7,088,722 B1
(45) Date of Patent: Aug. 8, 2006

(54) METHOD AND SYSTEM FOR CONTROLLING FLOW OF MULTIPLEXED DATA

(75) Inventor: William P. Hann, Round Rock, TX (US)

(73) Assignee: Cisco Technology, Inc., San Jose, CA (US)

( * ) Notice: Subject to any disclaimer, the term of this patent is extended or adjusted under 35 U.S.C. 154(b) by 866 days.

(21) Appl. No.: 10/112,389

(22) Filed: Mar. 28, 2002

(51) Int. Cl.
H04L 12/28 (2006.01)
H04L 12/56 (2006.01)

(52) U.S. Cl. ............... 370/395.2; 370/229; 370/235; 370/468

(58) Field of Classification Search ............ 370/395.2, 370/395.21, 395.32, 468, 229, 230, 231, 370/232, 235, 237
See application file for complete search history.

(56) References Cited

U.S. PATENT DOCUMENTS

| | | | | |
|---|---|---|---|---|
| 5,761,191 A | * | 6/1998 | VanDervort et al. | 370/232 |
| 5,812,527 A | * | 9/1998 | Kline et al. | 370/232 |
| 5,867,480 A | * | 2/1999 | Thomas et al. | 370/230 |
| 5,941,952 A | * | 8/1999 | Thomas et al. | 709/234 |
| 5,999,980 A | * | 12/1999 | Tanaka et al. | 709/235 |
| 6,711,162 B1 | * | 3/2004 | Ortega et al. | 370/389 |
| 6,721,336 B1 | * | 4/2004 | Witel et al. | 370/474 |
| 6,754,206 B1 | * | 6/2004 | Nattkemper et al. | 370/369 |
| 2002/0031141 A1 | * | 3/2002 | McWilliams | 370/463 |
| 2002/0126704 A1 | * | 9/2002 | Cam et al. | 370/503 |
| 2002/0176430 A1 | * | 11/2002 | Sangha et al. | 370/412 |
| 2003/0099193 A1 | * | 5/2003 | Liu et al. | 370/229 |

* cited by examiner

Primary Examiner—Ajit Patel
Assistant Examiner—Chirag Shah
(74) Attorney, Agent, or Firm—Baker Botts L.L.P.

(57) ABSTRACT

According to one embodiment of the invention, a method for controlling flow of data cells within a digital subscriber line access multiplexer is provided. The method includes providing a flow control package for a cell delineation module of the digital subscriber line access multiplexer. The method also includes receiving, at the flow control package, at least one signal indicating that one or more buffers within the digital subscriber line access multiplexer have reached a predetermined data storage capacity. The method also includes directing, from the flow control package, at least one device that is operable to transmit the data to the one or more buffers to halt transmission of the data to the one or more buffers in response to receiving the signal.

31 Claims, 4 Drawing Sheets ial data multiplexing lowers the cost of manufacturing a DSLAM. According to another embodiment, polling mechanisms within a DSLAM may be eliminated, which lowers the cost of manufacturing the DSLAM and saves circuit board space.

METHOD AND SYSTEM FOR CONTROLLING FLOW OF MULTIPLEXED DATA

TECHNICAL FIELD OF THE INVENTION

This invention relates generally to communications and more particularly to controlling the flow of multiplexed data.

BACKGROUND OF THE INVENTION

Digital subscriber line (DSL) technology provides faster data service over existing twisted pair wiring. Implementation of DSL technology requires a communications server that may operate as an interface between the individual DSL subscribers and the Internet Protocol (IP) network.

Advances in communications technology provide methods for making DSL servers that are less expensive and more powerful. For example, data multiplexing may be implemented within the communications server to reduce the number of components on associated circuit boards. Reducing the number of components reduces the cost of manufacturing the server and frees circuit board space. The circuit board space made available may be used to add more capabilities to the communications server. However, data multiplexing may also adversely affect the ability to control data flow within the communications server. This lack of flow control may cause data overflow at buffers associated with the communications server.

SUMMARY OF THE INVENTION

According to one embodiment of the invention, a method for controlling flow of data cells within a digital subscriber line access multiplexer is provided. The method includes providing a flow control package for a cell delineation module of the digital subscriber line access multiplexer. The method also includes receiving, at the flow control package, at least one signal indicating that one or more buffers within the digital subscriber line access multiplexer have reached a predetermined data storage capacity. The method also includes directing, from the flow control package, at least one device that is operable to transmit the data to the one or more buffers to halt transmission of the data to the one or more buffers in response to receiving the signal.

According to another embodiment of the invention, a system for controlling flow of data cells within a digital subscriber line access multiplexer is provided. The system includes a flow control package that is coupled to a cell delineation module of the digital subscriber line access multiplexer. The flow control package is operable to receive at least one signal indicating that one or more buffers within the digital subscriber line access multiplexer have reached a predetermined data storage capacity. In response, the flow control package is operable to direct at least one device that is operable to transmit the data to the one or more buffers to halt transmission of the data to the one or more buffers.

Some embodiments of the invention provide numerous technical advantages. Some embodiments may benefit from some, none, or all of these advantages. For example, according to one embodiment, controlling the flow of multiplexed data avoids data overflow at the internal buffers of a digital subscriber line access multiplexer ("DSLAM"). According to another embodiment, allowing internal data multiplexing saves circuit board space on a network interface card, which reduces the challenges of circuit board design and allows more capabilities to be added. According to another embodi- Other technical advantages may be readily ascertained by one of skill in the art.

BRIEF DESCRIPTION OF THE DRAWINGS

Reference is now made to the following description taken in conjunction with the accompanying drawings, wherein like reference numbers represent like parts, in which.

DETAILED DESCRIPTION OF EXAMPLE EMBODIMENTS OF THE INVENTION

Embodiments of the invention are best understood by referring to FIGS. 1 through 4 of the drawings, like numerals being used for like and corresponding parts of the various drawings.

Figure 1:
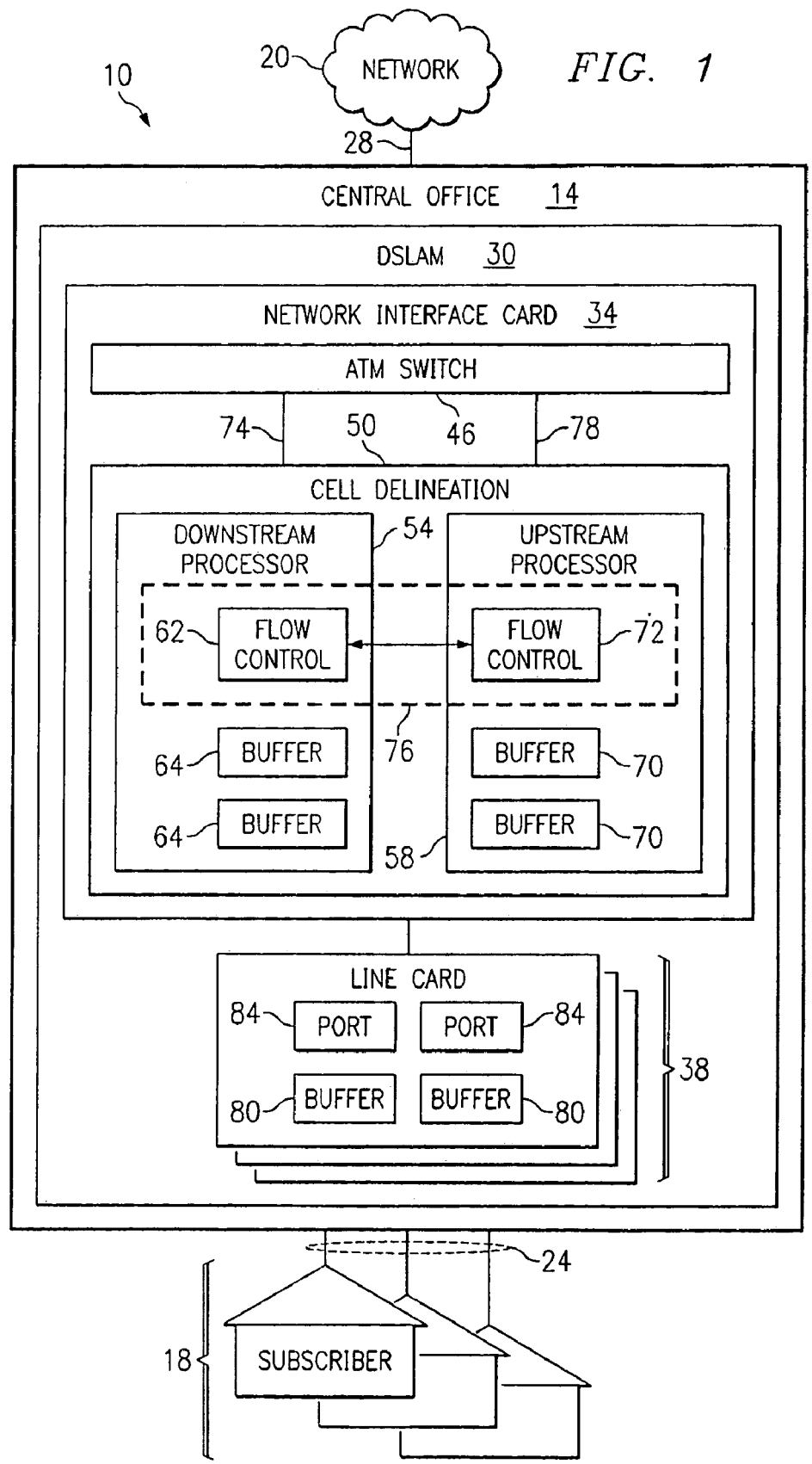
FIG. 1 is a block diagram illustrating an embodiment of a communications system that may benefit from the teachings of the present invention.

FIG. 1 is a block diagram of a communications system 10 that may benefit from the teachings of the present invention. System 10 includes a central office 14, a plurality of homes or businesses (or other locations) 18 (referred to herein as "subscribers 18") and a network 20, such as an Internet Protocol network. Subscribers 18 are coupled to central office 14 by a plurality of lines 24, such as telephone lines. Central office 14 is coupled to network 20 by a trunk line 28. Trunk line 28 may be any suitable communication link that may carry Internet protocol traffic, including OC3, DS3, and T1 (STM 1, E3, E1, in Europe).

Central office 14 comprises, among other components not explicitly shown, a digital subscriber line access multiplexer ("DSLAM") 30. DSLAM 30 allows communication between subscribers 18 and network 20. DSLAM 30 comprises, in this example, a network interface card 34 and a plurality of line cards 38. Each line card 38 is coupled to network interface card 34.

Network interface card 34 comprises, among other components not explicitly shown, an Asynchronous Transfer Mode ("ATM") switch 46 and a cell delineation module 50. Cell delineation module 50 comprises a downstream processor 54 and an upstream processor 58. Downstream processor 54 and upstream processor 58 may be implemented using a field programmable gate array ("FPGA"). However, other suitable forms, such as an application specific integrated circuit (ASIC), may be used. FPGA is used herein as a representative example of implementing downstream processors and upstream processors. As such, downstream processor 54 and upstream processor 58 are referred to herein as "downstream FPGA 54" and "upstream FPGA 58," respectively.

Downstream FPGA 54 includes a plurality of downstream buffers 64. Buffers are sometimes referred to as "FIFOs," which is one example of a protocol for servicing data that is stored in the buffers. Buffers are referred to herein as "FIFOs." However, other protocols for servicing data may be used by the buffers. Upstream FPGA 58 includes a plurality of upstream FIFOs 70. A line 74 couples ATM switch 46 to downstream FPGA 54 of cell delineation module 50. A line 78 couples ATM switch 46 to upstream FPGA 58. An example of lines 74 and 78 is a UTOPIA bus.

Each line card 38 comprises, among other components not explicitly shown, a plurality of line card buffers, referred to in this example as FIFOs 80, and a plurality of ports 84. Each port 84 is used to associate a particular subscriber 18 to downstream FPGA 54 and upstream FPGA 58.

In operation, network interface card 34 communicates with network 20 over trunk line 28. ATM switch 46 of network interface card 34 receives data from network 20 over trunk line 28. Received data may comprise cells or packets of data. ATM switch 46 then processes the data and sends the data to downstream FPGA 54 over line 74. Downstream FPGA 54 stores the data in downstream FIFOs 64, delineates data cells from the data, and sends the delineated data cells to a particular line card 38 that is associated with the intended destination of the data cells. Cell delineation refers to the process which allows identification of the cell boundaries. A "data cell" refers to a bundle of information. For example, an ATM data cell is a bundle of fifty-three bytes of data. Upstream FPGA 58 receives data from each line card 38, stores the data in upstream FIFOs 70, and delineates data cells from the data. The data cells are sent to ATM switch 46 over line 78. ATM switch 46 processes the received data and then sends the received data to network 20. Network interface card 34 also manages other aspects of DSLAM 30, including system help, system performance, switch help and performance, and network communications.

Line cards 38 receive data at ports 84 over telephone lines 24 from subscribers 18, store the data in line card FIFOs 80, and communicate the data to upstream FPGA 58 of network interface card 34 for eventual transmission to network 20. Conversely, line cards 38 receive data at ports 84 from network 20 through downstream FPGA 54, store the data at line card FIFOs 80, and communicate the data to the subscribers 18 over lines 24. In some embodiments, DSLAM 30 may include more than one network interface card and greater or lesser number of line cards than the number shown in FIG. 1. In some embodiments, network interface card 34 may include a plurality of ATM switches and a plurality of cell delineation modules.

In some embodiments, the flow of data within DSLAM 30 must be controlled so that FIFOs 64, 70, and 80 within DSLAM 30 may avoid receiving data at a rate that exceeds their respective data storage capacities. Reaching or exceeding the data storage capacity of a FIFO is generally referred to as "FIFO overflow."

In some embodiments, flow control of data occurs naturally in a system where FIFOs are polled before data is sent to the FIFOs. The rate of polling is synchronized to the clock rate associated with a FIFO. Because the clock rate associated with a FIFO is below the rate that may cause a FIFO overflow, polling provides a built-in control of data flow. For example, ATM switch 46 may poll downstream FIFOs 64 over line 74 at the clock rate of each downstream FIFO 64. As such, ATM switch 46 sends data to downstream FIFOs 64 without exceeding the clock rates of the downstream FIFOs 64. Because the clock rates are below the rate that may cause a FIFO overflow and polling is synchronized to the clock rate of each downstream FIFO 64, the flow of data to FIFOs 64 is controlled by the polling procedure. Similarly, polling also controls data flow where each port 84 of line card 38 is associated with one dedicated downstream FIFO 64 and one dedicated upstream FIFO 70. Each port 84 sends a clock bit to its one dedicated downstream FIFO 64 and one dedicated upstream FIFO 70. Each port 84 receives a data bit from its one dedicated downstream FIFO 64 and sends a data bit to its one dedicated upstream FIFO 70. As such, line card FIFOs 80 may be polled by their respective downstream FIFOs 64 and thus receive data at the rates established by line card FIFOs 80. Similarly, upstream FIFOs 70 may be polled by their respective line card FIFOs 80 and thus receive data at the rates established by upstream FIFOs 70.

The flow control of data cells using the polling of FIFOs, such as FIFOs 64, 70, and 80, may not be possible when data communicated between cell delineation block 50 and line cards 38 is multiplexed. Multiplexing may reduce the number of buses within DSLAM 30, which saves circuit board space and reduces the cost of manufacturing DSLAM 30. However, in some embodiments, multiplexing data between cell delineation module 50 and line cards 38 results in multiple ports 84 sending and receiving only one data bit at a faster clock rate without a dedicated clock bit for each port 84. This is different than each port 84 sending and receiving its own data bit and a clock bit dedicated to that data bit. Because there is no dedicated clock bit for each port 84 when data is multiplexed, multiplexing of data within DSLAM 30 removes polling as a method of controlling data flow. Without any flow control, DSLAM 30 may not benefit from internal multiplexing of data because FIFO overflow may occur at any one of FIFOs 64, 70, and 80.

According to the teachings of some embodiments of the invention, a method and system are provided that control the flow of multiplexed data within DSLAM 30 by providing a flow control package 76. In one embodiment, flow control package 76 comprises a downstream flow control unit 62 and an upstream flow control unit 72. Flow control package 76 receives indications from one or more FIFOs 64, 70, and 80 that their respective preset data storage limits have been reached. In one embodiment, the preset data storage limit is set below the maximum data storage capacity of a FIFO. In one embodiment, in response to receiving the indications, flow control package 76 directs ATM switch 46 and other devices that may send data to the one or more FIFOs 64, 70, and 80 to halt transmitting data. By directing ATM switch 46 and other devices to halt the transmission of data, flow control package 76 prevents FIFO overflow without relying on the polling of FIFOs 64, 70, and 80. Using a similar procedure and devices described above, FIFOs 64, 70, and 80 may also signal flow control package 76 to direct ATM switch 46 and other devices to resume the transmission of data if the amount of data stored in FIFOs 64, 70, and 80 falls below their respective preset data storage limits.

Controlling the flow of multiplexed data avoids FIFO overflow while allowing the multiplexing of data within DSLAM 30. In one embodiment, circuit board space on network interface card 34 is saved, which simplifies the circuit board design and allows more DSLAM capabilities to be added. In some embodiments, the reduction of the number of buses on network interface card 34 due to the multiplexing of data lowers the cost of manufacturing DSLAM 30. In some embodiments, the polling mechanism within DSLAM 30 may be eliminated because polling no longer controls the flow of data. Eliminating the polling mechanism lowers the cost of manufacturing DSLAM 30 and saves circuit board space. Additional details of example embodiments of the system and method are described in greater detail below in conjunction with FIGS. 2 through 4.

Figure 2:
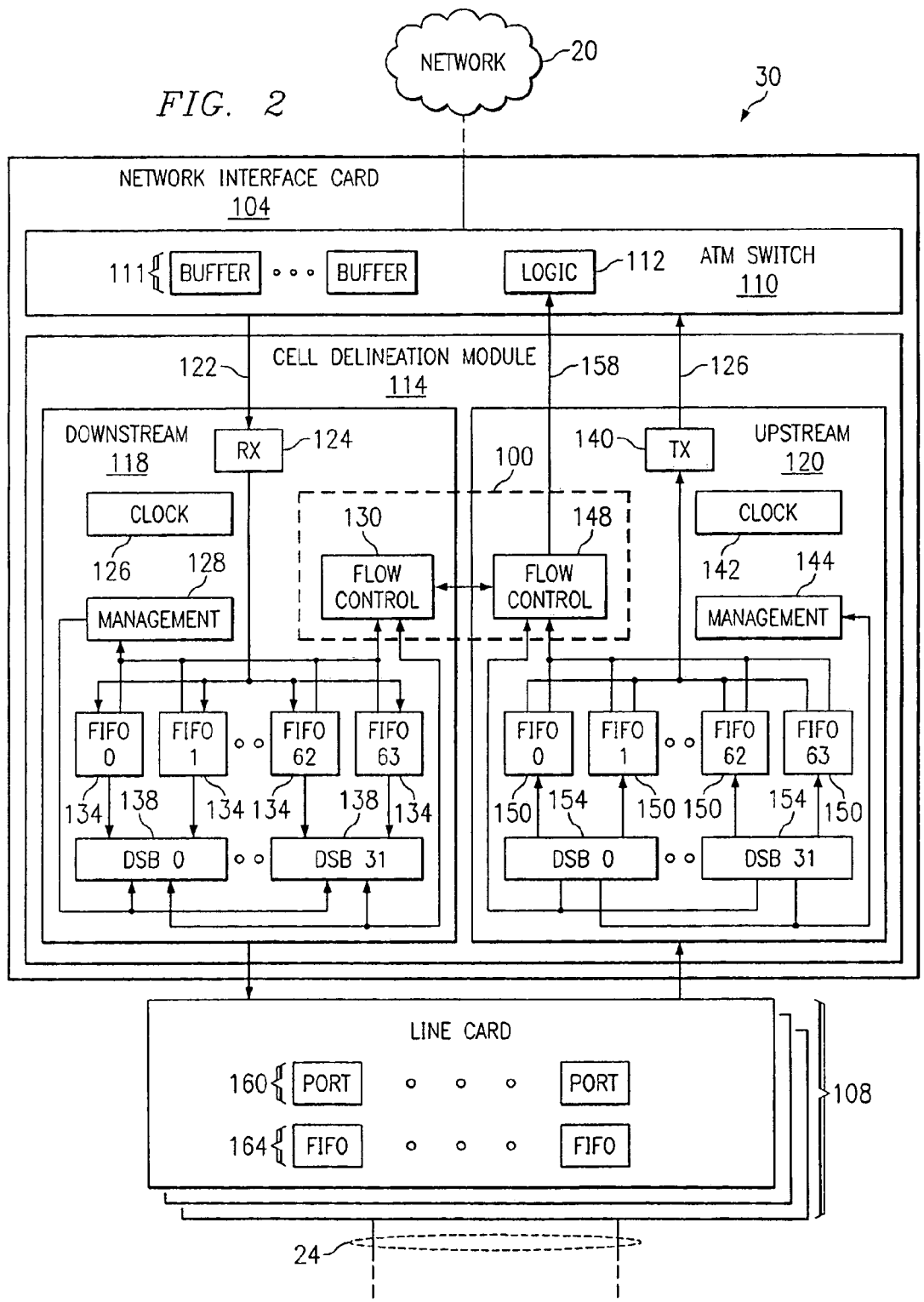
FIG. 2 is a block diagram illustrating an embodiment of a digital subscriber line access multiplexer of the communications system shown in FIGURE 1.

FIG. 2 is a block diagram showing additional details of an embodiment of DSLAM 30 shown in FIG. 1. In this embodiment, DSLAM 30 comprises a network interface card 104 coupled to a plurality of line cards 108. Network interface card 104 comprises an ATM switch 110 having a logic unit 112 and a plurality of buffers 111. Network interface card 104 also comprises a cell delineation module 114 having a downstream FPGA 118 and an upstream FPGA 120. ATM switch 110 is coupled to downstream FPGA 118 by a bus 122. ATM switch 110 is coupled to upstream FPGA 120 by a bus 126. An example of buses 122 and 126 is a UTOPIA bus. Downstream FPGA 118 and upstream FPGA 120 may be implemented using forms other than a FPGA, such as an ASIC.

Downstream FPGA 118 comprises a receive block 124, a clock 126, a management block 128, and a flow control unit 130. Downstream FPGA 118 also comprises a plurality of downstream FIFOs 134 and a plurality of downstream buses 138. An example of downstream bus 138 is a digital serial bus. In one embodiment, downstream FPGA 118 comprises sixty-four downstream FIFOs 134 and thirty-two downstream buses 138; however, more or less downstream FIFOs 134 and downstream buses 138 may be included in downstream FIFOs 134. Receive block 124 is coupled to each downstream FIFO 134. In one embodiment, two downstream FIFOs 134 are coupled to each downstream bus 138. Management block 128 is coupled to each downstream bus 138. Flow control unit 130 is also coupled to each downstream bus 138.

Upstream FPGA 120 comprises a transmit block 140, a clock 142, a management block 144, and a flow control unit 148. Upstream FPGA 120 also comprises a plurality of upstream FIFOs 150 and a plurality of upstream buses 154. An example of upstream bus 154 is a digital serial bus. In one embodiment, upstream FPGA 120 comprises sixty-four upstream FIFOs 150 and thirty-two upstream buses 154; however, more or less upstream FIFOs 150 and upstream buses 154 may be included in upstream FPGA 120. Transmit block 140 is coupled to each upstream FIFO 150. Each upstream bus 154 is coupled to two particular upstream FIFOs 150. Management block 144 is coupled to each upstream bus 154. Flow control unit 148 is coupled to each upstream bus 154.

In the embodiment shown in FIG. 2, a flow control package 100 comprises flow control units 130 and 148. Flow control unit 148 is associated with flow control unit 130. Flow control package 100 may comprise any number of flow control unit, such as flow control unit 148. Flow control package 100 is coupled to logic unit 112 by a bus 158, such as a UTOPIA bus. In one embodiment, flow control unit 148 of flow control package 100 is coupled to logic unit 112 by bus 158.

Each line card 108 comprises a plurality of ports 160 and a plurality of line card FIFOs 164. Ports 160 are coupled to line card FIFOs 164. Each port 160 is coupled to downstream FPGA 118 and upstream FPGA 120. Because data is multiplexed between ports 160 and buses 138 and 154, at least two ports 160 share one downstream bus 138 to receive data from downstream FPGA 118. Similarly, at least two ports 160 share one upstream bus 154 to send data to upstream FPGA 120. However, a set of multiple ports 160 continues to be associated with two particular downstream FIFOs 134 by one of the channels of the associated downstream bus 138. Similarly, a set of ports 160 continues to be associated with two particular upstream FIFOs 150 by one of the channels of the associated upstream bus 154. In an embodiment where there are sixty-four downstream FIFOs 134 and thirty-two downstream digital serial buses 138, data from two downstream FIFOs 134 is multiplexed to the multiple associated ports 160 over one downstream digital serial bus 138. Similarly, in an embodiment where there are sixty-four upstream FIFOs 150 and thirty-two upstream digital serial buses 154, data from the multiple associated ports 160 is multiplexed to two upstream FIFOs 150 over one upstream digital serial bus 154. In some embodiments, data from more than two downstream FIFOs 134 may be multiplexed to the multiple associated ports 160.

In operation, ATM switch 110 receives data from network 20 at buffers 111 and transmits that data to receive block 124 of downstream FPGA 118 over bus 122. Receive block 124 is operable to direct the data to the appropriate one of downstream FIFOs 134. After receiving the respective data, downstream FIFOs 134 store their respective data until the data can be delineated into data cells. After cell delineation is performed, each downstream bus 138 receives the delineated cells from the associated two downstream FIFOs 134, along with any flow control signals from flow control unit 130 and any clock bits from clock block 126. Each downstream bus 138 then multiplexes the received signals and data cells to the respectively associated line cards 108. Line card 108 receives the multiplexed delineated cells at ports 160. The received data cells are stored in line card FIFOs 164 until they are transmitted to the intended subscribers 18 over lines 24.

Line cards 108 also receive data from subscribers 18 over lines 24. Data is received by ports 160 and stored in upstream line card FIFOs 164 until the data may be multiplexed to respectively associated upstream buses 154. After receiving the multiplexed data, each upstream bus 154 carries its respective data to the associated two upstream FIFOs 150 for storage. Upstream FIFOs 150 receive only the data that is transmitted from respectively associated ports 160. Upstream FIFOs 150 send the data to transmit block 140. Transmit block 140 then transmits the received data cells to ATM switch 110 over bus 126 for eventual transmission to network 20. Along with the delineated cells, each upstream bus 154 also receives any flow control signals and a clock bit from their respectively associated ports 160. The flow control signal is transmitted to flow control unit 148. A flow control signal is any signal indicating whether any one of FIFOs in DSLAM 30 has reached a predetermined data storage limit.

In one embodiment, to prevent FIFO overflow, flow control package 100 is operable to receive flow control signals indicating that any one of FIFOs 134, 150, and 164 is approaching or has reached FIFO overflow. In one embodiment, flow control unit 148 is operable to receive the flow control signals from downstream FIFOs 134, upstream FIFOs 150, and/or line card FIFOs 164. After receiving a flow control signal, in one embodiment, flow control unit 148 may direct, over bus 158, logic unit 112 of ATM switch 110 to halt the transmission of data from ATM switch 110 to downstream FPGA 118. In one embodiment, ATM switch 110 may control the flow of data using buffers 111. Each buffer 111 is associated with a particular port (not explicitly shown) of buses 138. As such, flow of data to individual ports of buses 138 may be controlled by ATM switch 110. In one embodiment, flow control package 100 may be used to halt the flow of data cells at other parts of DSLAM 30, such as downstream buses 138 and line cards 108.

In one embodiment, flow control unit 148 may receive a flow control signal indicating that downstream FIFOs 134 have reached a predetermined level of data storage. The predetermined level of data storage that triggers the transmission of a flow control signal may be set at the maximum data storage capacity of a FIFO or at a limit that is less than the maximum data storage capacity, as determined by one skilled in the art. One example of the predetermined data storage limit that may trigger a transmission of a flow control signal is 50% of the maximum data storage capacity of a FIFO. Downstream FIFOs 134 notify flow control unit 130 that the predetermined level of data storage has been reached. Then flow control unit 130 transmits the flow control signal to flow control unit 148. In response, flow control unit 148 directs logic unit 112 over bus 158 to halt transmission of data intended for the respective line card 108 to downstream FPGA 118. Halting the transmission of data to downstream FPGA 118 stops downstream FIFOs 134 from overflowing.

In one embodiment, FIFO overflow at line card FIFOs 164 may be prevented by flow control package 100. After reaching a predetermined data storage limit, line card FIFOs 164 may transmit a flow control signal to flow control unit 148, indicating that a predetermined data storage limit has been reached. In one embodiment, the flow control signal may be multiplexed along with the data that is sent from line cards 108 to upstream buses 154. Upstream bus 154 that receives the flow control signal may route the flow control signal to flow control unit 148. After receiving the flow control signal, flow control unit 148 directs logic unit 112 over bus 158 to halt transmission of data intended for the respective port (not explicitly shown) of the respective line card 108 to downstream FPGA 118. In one embodiment, before, during, or after communicating with logic unit 112, flow control unit 148 also notifies flow control unit 130 to direct the respective downstream buses 138 to halt sending data to line card FIFOs 164. By halting the multiplexing of data at downstream buses 138, FIFO overflow is avoided at line card FIFOs 164. However, with downstream buses 138 no longer sending data to line cards 108, downstream FIFOs 134 may experience FIFO overflow. To prevent this, the transmission of data from ATM switch 110 to downstream FPGA 118 is also halted.

In one embodiment, FIFO overflow at upstream FIFOs 150 may be prevented by flow control package 100. Upstream FIFOs 150 notify flow control unit 148 that their respective predetermined data storage limits have been reached. In response, flow control unit 148 notifies flow control unit 130 to send a flow control signal to line cards 108 to stop sending data to upstream FPGA 120. In one embodiment, the flow control signal may be multiplexed along with the data that is sent to line cards 108. By halting the transmission of data at line cards 108, FIFO overflow is avoided at upstream FIFOs 150.

Some embodiments of the invention described above may also be used to resume receiving data at FIFOs 134, 150, and 164 within DSLAM 30 once the FIFOs transition from reaching the predetermined data storage limit to falling below the predetermined data storage limit. Similar procedures using similar devices, all described above, may be used to resume the transmission of data from any device, such as ATM switch 110, to any FIFO, such as downstream FIFOs 134. For example, downstream FIFOs 134 may send a flow control signal to flow control unit 130 indicating a request to resume receiving data from ATM switch 110. In response, flow control unit 130 may notify flow control unit 148 to direct ATM switch 110 to resume transmitting data to downstream FPGA 118. Flow control unit 148 then directs logic unit 112 of ATM switch 110 to resume transmission of data intended for the respective port (not explicitly shown) of the respective line card 108 or the entire line card 108 to downstream FPGA 118.

It should be understood that each FIFO may send its own request for start or stop of data transmission. In response to receiving such a request, a source device, such as ATM switch 110, may control the flow of data at each one of the buffers 111, individually or as a group.

Using flow control package 100 to control the flow of data within DSLAM 30 allows delineated cells from cell delineation module 114 to be multiplexed to and from line cards 108 while avoiding FIFO overflow. Because data may be multiplexed without FIFO overflow, circuit board space within DSLAM 30 is saved. Furthermore, reduction of the number of buses and the elimination of polling mechanisms within DSLAM 30 lowers the cost of manufacturing DSLAM 30 and saves circuit board space.

Figure 3:
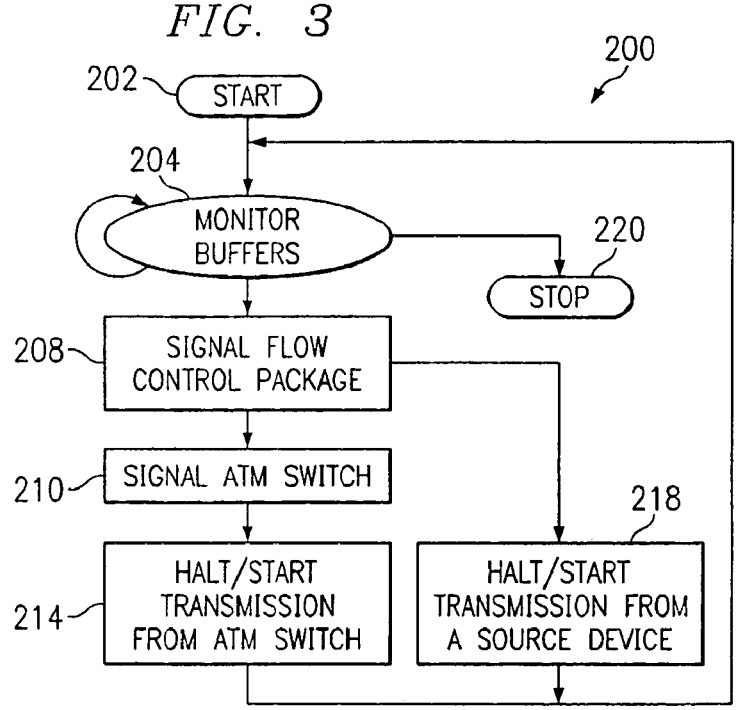
FIG. 3 is a flow chart illustrating an embodiment of a method of controlling the flow of multiplexed data in the digital subscriber line access multiplexer shown in FIG. 2.

FIG. 3 is a flow chart showing a method 200 of controlling flow of data that is multiplexed within DSLAM 30 shown in FIG. 2. Method 200 may be implemented by network interface card 104 and line cards 108 shown in FIG. 2. Method 200 starts at step 202. At step 204, FIFOs within DSLAM 30 are continuously monitored for status of data storage capacity. For example, any one of FIFOs 134, 150, and 164 may monitor themselves to determine whether more data may be received without risking FIFO overflow. At step 208, any one of FIFOs 134, 150, and 164 signals flow control package 100. The signal indicates a request to either start or stop the transmission of data. In one embodiment, flow control unit 130 may be signaled first. In response, flow control unit 130 may signal flow control unit 148. Conversely, flow control unit 148 may be signaled first. In response flow control unit 148 may signal flow control unit 130. At step 210, ATM switch 110 is signaled by flow control packet 100. In one embodiment, flow control unit 148 signals logic unit 112 of ATM switch 110 over bus 158. At step 214, in response to receiving a signal from flow control package 100, ATM switch 110 either starts or stops transmission of data to downstream FPGA 118, depending on the indication of the signal. In some embodiments, transmission of data may also be started or stopped from other source devices at step 218. Examples of other source devices are downstream buses 138 and line cards 108. Additional details of step 218 are described in conjunction with FIG. 4. Steps 204 through 218 are continually performed until the monitoring of FIFOs at step 204 stops. When the monitoring stops, method 200 stops at step 220.

Figure 4:
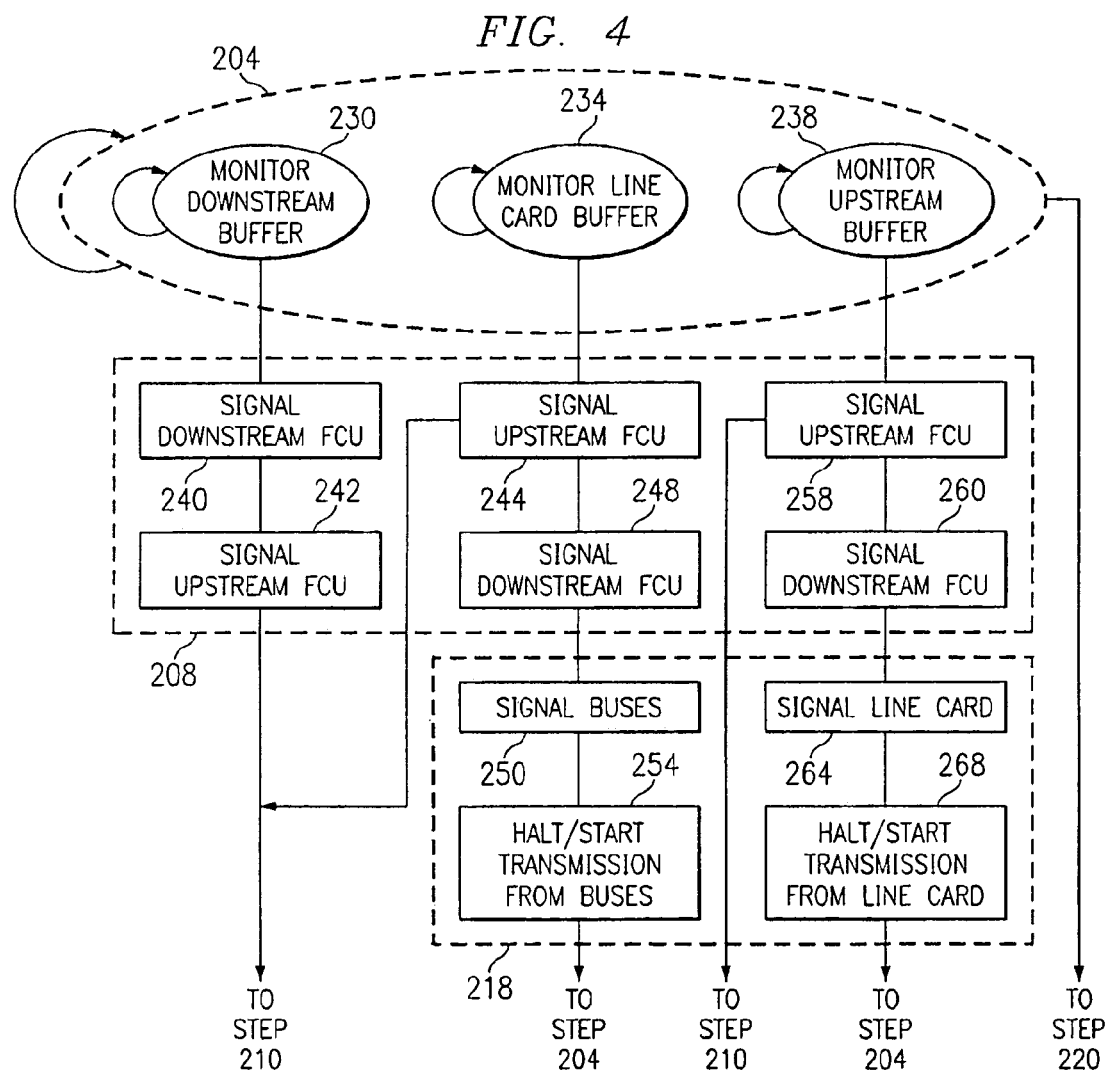
FIG. 4 is a flow chart illustrating an embodiment of some of the acts of the method shown in FIG. 3.

FIG. 4 is a flow chart illustrating additional details of steps 204, 208, and 218 of method 200 shown in FIG. 3. In one embodiment of step 204, downstream FIFOs 134, line card FIFOs 164, and upstream FIFOs 150 are monitored at steps 230, 234, and 238, respectively. Steps 230, 234, and 238 may be performed simultaneously or in any order within step 204. In one embodiment of step 208, if downstream FIFOs 134 have reached a predetermined data storage limit, downstream FIFOs 134 send a signal to flow control unit 130 at step 240 indicating a request to stop receiving data from ATM switch 110. If downstream FIFOs 134 transition from reaching the predetermined data storage limit to falling below the predetermined data storage limit, downstream FIFOs 134 send a signal to flow control unit 130 indicating a request to resume receiving data from ATM switch 110. At step 242, in response to receiving the signal, flow control unit 130 signals flow control unit 148. After receiving an indication of the desire to stop or resume receiving data, flow control 148 performs the remaining steps of method 200 shown in FIG. 3.

In one embodiment of step 208, if line card FIFOs 164 have reached a predetermined data storage limit, line card FIFOs 164 send a signal to flow control unit 148 at step 244 indicating a request to stop receiving data from downstream FPGA 118. If line card FIFOs 164 transition from reaching the predetermined data storage limit to falling below the predetermined data storage limit, line card FIFOs 164 send a signal to flow control unit 148 indicating a request to resume receiving data from downstream FPGA 118. After receiving the indication of the desire to either stop or resume receiving data, flow control unit 148 performs the remaining steps of method 200 shown in FIG. 3. At step 248, in response to receiving the signal, flow control unit 148 signals flow control unit 130. In one embodiment of step 218, flow control unit 130 directs downstream buses 138 at step 250 to either start or stop multiplexing data to line card FIFOs 164, depending on the indication received by flow control unit 130. At step 254, downstream buses 138 that are directed by flow control unit 130 either start or stop the transmission of data to line cards 108.

In one embodiment of step 208, if upstream FIFOs 150 have reached a predetermined data storage limit, upstream FIFOs 150 send a signal to flow control unit 148 at step 258 indicating a request to stop receiving data from line cards 108. If upstream FIFOs 150 transition from reaching the predetermined data storage limit to falling below the predetermined data storage limit, upstream FIFOs 150 send a signal to flow control unit 148 indicating a request to resume receiving data from line cards 108. After receiving the indication of the desire to either stop or resume receiving data, flow control 148 performs the remaining steps of method 200 shown in FIG. 3. At step 260, in response to receiving the signal, flow control unit 148 signals flow control unit 130. In one embodiment of step 218, at step 264, flow control unit 130 sends a signal directing line cards 108 to either start or stop transmitting data to upstream FIFOs 150, depending on the indication received by flow control unit 130. At step 268, line cards 108 that are directed by flow control unit 130 either start or stop the transmission of data to line cards 108.

Methods and systems described in detail above offer a solution to the lack of data flow control in DSLAMs where data is multiplexed from a cell delineation module to line cards. By providing a flow control package that may use an ATM switch and other intermediate source devices to control the flow of data, the flow of multiplexed data may be controlled to avoid FIFO overflow. Allowing the multiplexing of data saves circuit board space in a network interface card and reduces the cost of manufacturing a DSLAM by reducing the number of buses between the cell delineation module and the line cards. Furthermore, the cost is also reduced by eliminating any polling mechanisms that may be present in the DSLAM.

Although the present invention has been described in detail, it should be understood that various changes, substitutions, and alterations can be made hereto without departing from the spirit and scope of the invention as defined by the appended claims.

What is claimed is:

1. A method for managing flow of cells in a network interface unit having an Asynchronous Transfer Mode switch and associated with a plurality of line cards, the method comprising:

providing a flow control unit and a cell delineation module, the cell delineation module comprising a downstream processor and an upstream processor;

determining that a device selected from a group consisting of the upstream processor, the downstream processor, and any one of the plurality of line cards includes a buffer that has reached a predetermined data storage capacity;

in response to the determining, transmitting an indication to the flow control unit that the predetermined data storage capacity of the buffer has been reached;

transmitting a request to the Asynchronous Transfer Mode switch to halt the flow of data to the downstream processor; and in response to the request, halting, by the Asynchronous Transfer Mode switch, transmission of data to the downstream processor.

2. The method of claim 1, wherein the flow control unit is a first flow control unit associated with the upstream processor, and further comprising providing a second flow control unit for the downstream processor, wherein transmitting an indication to the flow control unit comprises transmitting an indication to the first flow control unit through the second flow control unit that the predetermined cell storage capacity of the buffer has been reached.

3. The method of claim 1, wherein the flow control unit is a first flow control unit associated with the upstream processor, the request is a first request, and the device is any one of the plurality of line cards, and further comprising:

providing a second flow control unit for the downstream processor;

transmitting, through the second flow control unit, a second request to a plurality of digital serial buses associated with the downstream processor to halt the flow of data from the downstream processor to the any one of the plurality of line cards.

4. The method of claim 1, wherein the flow control unit is a first flow control unit associated with the upstream processor, the request is a first request, and the device is the upstream processor, and further comprising:

providing a second flow control unit for the downstream processor;

transmitting, through the second flow control unit, a second request to the plurality of line cards associated with the downstream processor to halt the flow of data from the plurality of line cards to the upstream processor.

5. The method of claim 1, and further comprising associating the flow control unit with the upstream processor.

6. The method of claim 1, wherein transmitting a request to the Asynchronous Transfer Mode switch comprises transmitting a request, over a UTOPIA bus, to the Asynchronous Transfer Mode switch.

7. The method of claim 1, and further comprising:

after the halting, determining that a level of the data stored in the buffer has fallen below the predetermined data storage capacity;

notifying the flow control unit that the buffer is ready to resume receiving the data;

directing the Asynchronous Transfer Mode switch to resume transmitting the flow of data to the downstream processor; and in response to the request, resuming, by the Asynchronous Transfer Mode switch, transmission of data to the downstream processor.

8. A method for controlling flow of data cells within a digital subscriber line access multiplexer comprising:

providing a flow control package for a cell delineation module of the digital subscriber line access multiplexer;

receiving, at the flow control package, at least one signal indicating that one or more buffers within the digital subscriber line access multiplexer have reached a predetermined data storage capacity; and in response to the receiving, directing, from the flow control package, at least one device that is operable to transmit the data to the one or more buffers to halt transmission of the data to the one or more buffers.

9. The method of claim 8, wherein the at least one device comprises an Asynchronous Transfer Mode switch that is operable to transmit the data to the cell delineation module.

10. The method of claim 8, wherein the flow control package comprises a downstream flow control unit and an upstream flow control unit, the downstream flow control unit associated with a downstream processor of the cell delineation module and the upstream flow control unit associated with an upstream processor of the cell delineation module, and further comprising:

receiving, at the downstream flow control unit, an indication that the one or more buffers associated with the downstream processor have reached a predetermined data storage capacity; and in response to the receiving, sending the at least one signal to the upstream flow control unit.

11. The method of claim 8, wherein the at least one device comprises a downstream processor of the cell delineation module, the downstream processor operable to transmit the data to at least one line card disposed within the digital line subscriber access multiplexer, the one or more buffers associated with the at least one line card, and further comprising:

determining that the one or more buffers have reached a predetermined data storage capacity; and sending the at least one signal from the at least one line card to the flow control package.

12. The method of claim 8, wherein the at least one device comprises at least one line card disposed within the digital line subscriber access multiplexer, the at least one line card operable to transmit the data to an upstream processor of the cell delineation module, the one or more buffers associated with the upstream processor, and further comprising:

determining that the one or more buffers have reached a predetermined data storage capacity; and sending the at least one signal from the upstream processor to the flow control unit.

13. The method of claim 8, wherein directing at least one device to halt transmission of the data comprises multiplexing, to the at least one device, a command to halt transmission of the data.

14. The method of claim 8, wherein the at least one signal is the at least one first signal, and further comprising:

receiving, at the flow control package, at least one second signal indicating that a level of data storage in the one or more buffers is below the predetermined data storage capacity; and in response to the receiving, directing, from the flow control package, the at least one device that is operable to transmit the data to the one or more buffers to resume transmission of the data to the one or more buffers.

15. A system for managing flow of data in a communications device, the system comprising:

a cell delineation module coupled to a plurality of line cards, the cell delineation module comprising a downstream processor and an upstream processor, each one of the cell delineation module and the line cards having a respective plurality of buffers;

an Asynchronous Transfer Mode switch coupled to the downstream processor and the upstream processor, the Asynchronous Transfer Mode switch operable to halt the flow of data to the downstream processor in response to receiving a request to halt the flow of data; and a flow control unit coupled to the cell delineation module and the Asynchronous Transfer Mode switch, the flow control unit operable to receive a signal indicating that a predetermined data storage limit of any of the buffers has been reached, and in response, transmit the request.

16. The system of claim 15, wherein the flow control unit is operable to transmit the request to the Asynchronous Transfer Mode switch.

17. The system of claim 15, wherein the flow control unit is coupled to the upstream processor of the cell delineation module.

18. The system of claim 15, wherein the flow control unit is a first flow control unit associated with the upstream processor, and further comprising a second flow control unit associated with the downstream processor, the second flow control unit coupled to the first flow control unit.

19. The system of claim 15, wherein the flow control unit is a first flow control unit associated with the upstream processor, and further comprising a second flow control unit associated with the downstream processor, wherein the any of the buffers of the downstream processor is operable to transmit the signal to the second flow control unit and the second flow control unit is operable to, in response to receiving the signal, direct the first control unit to transmit the request to the Asynchronous Transfer Mode switch.

20. The system of claim 15, wherein the flow control unit is a first flow control unit associated with the upstream processor, and further comprising a second flow control unit associated with the downstream processor, wherein the any of the buffers of the line cards is operable to transmit the signal to the first flow control unit.

21. The system of claim 15, and further comprising a bus coupling the flow control unit to the Asynchronous Transfer switch.

22. The system of claim 15, wherein the flow control unit is a first flow control unit associated with the upstream processor, and further comprising:

a second flow control unit associated with the downstream processor;

a plurality of downstream buses coupled to the downstream processor; and a plurality of upstream buses coupled to the upstream processor, wherein each one of the line cards is coupled to a particular one of the downstream buses and a particular one of the upstream buses, the downstream buses operable to halt the flow of data to the line cards in response to receiving the request sent by the first flow control unit through the second flow control unit.

23. The system of claim 15, wherein the flow control unit is a first flow control unit associated with the upstream processor, and further comprising: a second flow control unit associated with the downstream processor, wherein the line cards are operable to halt the flow of data in response to the request sent by the first flow control unit through the second flow control unit.

24. The system of claim 15, wherein the plurality of buffers are a plurality of first buffers, and further comprising:

a plurality of second buffers coupled to the Asynchronous Transfer Mode switch, wherein the Asynchronous Transfer Mode switch is operable to halt the flow of data at each one of the second buffers;

a plurality of buses coupled to the downstream processor, each of the buses having a plurality of ports; and wherein the each one of the second buffers is associated with a particular one of the ports.

25. A system for controlling flow of data cells within a digital subscriber line access multiplexer comprising:

a flow control package coupled to a cell delineation module of the digital subscriber line access multiplexer; the flow control package operable to receive at least one signal indicating that one or more buffers within the digital subscriber line access multiplexer have reached a predetermined data storage capacity; and in response, direct at least one device that is operable to transmit the data to the one or more buffers to halt transmission of the data to the one or more buffers.

26. The system of claim 25, wherein the at least one device comprises an Asynchronous Transfer Mode switch that is operable to transmit the data to the cell delineation module.

27. The system of claim 25, wherein the flow control package comprises a downstream flow control unit and an upstream flow control unit, the downstream flow control unit associated with a downstream processor of the cell delineation module and the upstream flow control unit associated with an upstream processor of the cell delineation module, the flow control package operable to receive, at the downstream flow control unit, an indication that the one or more buffers associated with the downstream processor have reached the predetermined data storage capacity, and in response, send the at least one signal to the upstream flow control unit.

28. The system of claim 25, wherein the at least one device comprises a downstream processor of the cell delineation module, the downstream processor operable to transmit the data to at least one line card disposed within the digital line subscriber access multiplexer, the one or more buffers associated with the at least one line card, the one or more buffers operable to determine that the predetermined data storage limit has been reached, and in response, send the at least one signal from the at least one line card to the flow control package.

29. The system of claim 25, wherein the at least one device comprises at least one line card disposed within the digital line subscriber access multiplexer, the at least one line card operable to transmit the data to an upstream processor of the cell delineation module, the one or more buffers associated with the upstream processor, the one or more buffers operable to determine that the predetermined data storage limit has been reached, and in response, send the at least one signal from the upstream processor to the flow control unit.

30. The system of claim 25, wherein the at least one signal is the at least one first signal, the flow control package further operable to receive at least one second signal indicating that a level of data storage in the one or more buffers is below the predetermined data storage capacity, and in response, direct the at least one device that is operable to transmit the data to the one or more buffers to resume transmission of the data to the one or more buffers.

31. A system for controlling flow of data cells within a digital subscriber line access multiplexer comprising:

a flow control package for a cell delineation module of the digital subscriber line access multiplexer, the flow control package comprising:

means for receiving at least one signal indicating that one or more buffers within the digital subscriber line access multiplexer have reached a predetermined data storage capacity; and means for directing at least one device that is operable to transmit the data to the one or more buffers to halt transmission of the data to the one or more buffers.

* * * * *